June 15, 1971 B. L. BURGESS 3,585,102
RAPID SEATING FRICTION ELEMENTS
Filed Aug. 7, 1968
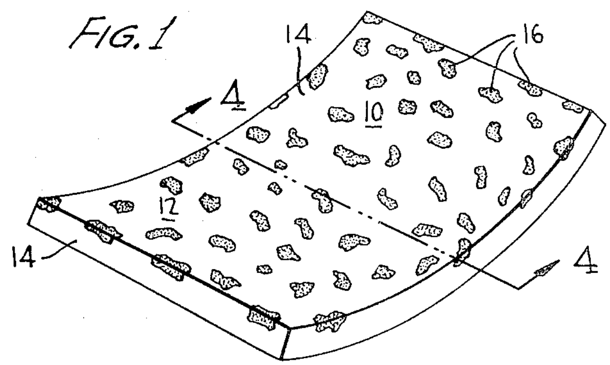
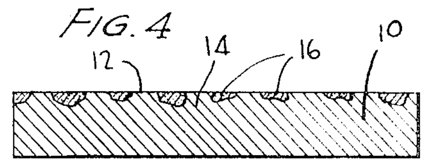
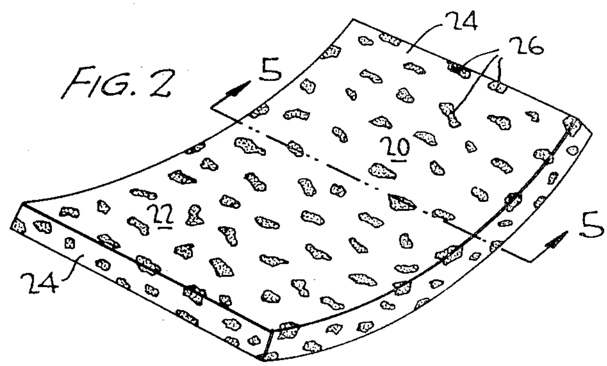
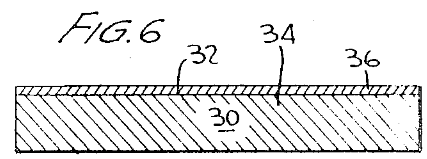
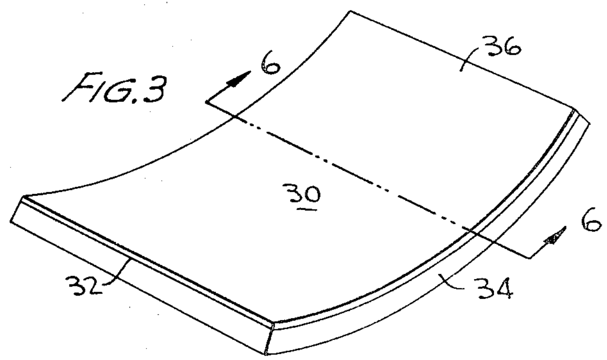
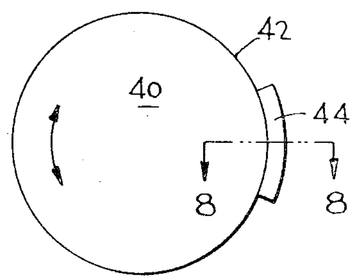
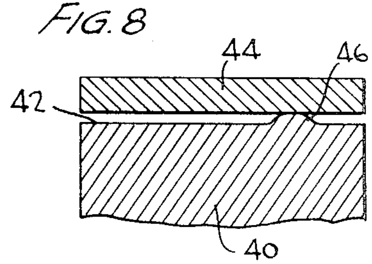
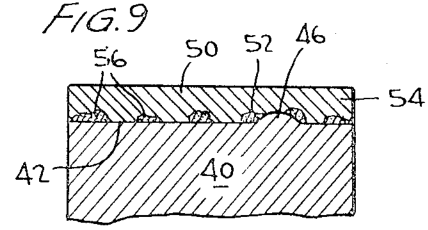
Watson, Cole, Grindle & Watson
ATTORNEYS

United States Patent Office 3,585,102

Patented June 15, 1971

3,585,102

RAPID SEATING FRICTION ELEMENTS

Bernard Lee Burgess, 3600–3608 Jacob St., Wheeling, W. Va. 26003

Filed Aug. 7, 1968, Ser. No. 750,891
Int. Cl. B32b *5/16, 19/08;* F16d *69/02*
U.S. Cl. 161—162 2 Claims

ABSTRACT OF THE DISCLOSURE

Novel composition friction elements are disclosed having the ability to quickly seat-in and conform to the contour of an irregular braking surface without fading or sacrificing braking life. The novel elements comprise a base of conventional friction material having a frictional contacting surface treated with a second friction material having a higher coefficient of friction and a lower resistance to wear than the base material.

BACKGROUND OF THE INVENTION

This invention relates to a composition friction element and more particularly to a novel friction element for use on large braking drums as in off-the-road equipment, such as winches, drag-lines, and the like.

It is often the case, especially in the early attempts to stop a rotating device using a new friction element or lining, that entirely unsatisfactory braking results are achieved. This results from the fact that the frictional contacting surface of the friction element does not always mate properly with the frictional contact surface of the rotating device, such as brake drum, to which it is applied. In such cases only the high points of these surfaces contact, causing unsatisfactory frictional engagement for the following two reasons. First, only a small percentage of the available frictional surface area is being utilized in the braking operation, and second, due to the resulting high concentration of braking forces over relatively small areas, very large amounts of frictional heat are produced, raising the temperatures of those areas in some circumstances to the points at which the binder of the composition friction material decomposes, melts, or powders, causing brake "fading."

The prior art has approached this problem by resorting to turning of the brake drum to produce a truly round surface, or by turning of the brake lining or friction element for the same purpose. Other prior attempts involved selecting for use conventional friction elements composed of materials which are either too hard and therefore seat-in slowly on an out-of-round drum, or are too soft, and have a short and unsatisfactory braking life.

It is an object of this invention to provide a unique friction element that will quickly seat-in and conform to the contour of an irregular braking surface, that will have a satisfactory braking life, and that will not fade during its period of seating-in.

BRIEF SUMMARY OF THE INVENTION

These and other problems have been solved by providing the novel friction elements of this invention. In particular, the novel friction elements are composed of a base of conventional friction material having its frictional contacting surface treated with a special friction material. The special friction material, which may be either imbedded in the form of chips in the frictional contacting surface of the base material, distributed in the form of chips throughout the entire base material, or laminated in a thin sheet to the contacting surface of the base material, is characterized by having a higher coefficient of friction and a lower resistance to wear than the conventional base material. The use of the special friction material provides a friction element having a relatively softer frictional contacting surface than conventional frictional elements, without sacrificing any of the frictional capabilities of the element. Thus, when the novel friction element of this invention is applied to an irregular braking surface such as that of an out-of-round brake drum, the rapid wearing away of the special friction material results in a rapid wearing-in and seating of the friction element while nevertheless affording a high frictional engagement between the friction element and the drum throughout the critical period when the contacting areas of the element and drum are at a minimum.

DESCRIPTION OF DRAWINGS

In the accompanying drawings:

FIGS. 1, 2 and 3 show in perspective three embodiments of the friction element of this invention.

FIGS. 4, 5 and 6 are cross-sectional views taken along lines 4—4, 5—5 and 6—6 of FIGS. 1, 2, and 3, respectively.

FIG. 7 is a schematic illustration of a friction element engaging a rotatable surface.

FIG. 8 is a partially broken away cross-sectional view taken along 8—8 of the apparatus shown in FIG. 7. In this exaggerated view the friction element of the prior art is shown attempting to engage an out-of-round portion of the rotatable surface.

FIG. 9 is similar to FIG. 8, except that one of the embodiments of the friction element of this invention has been substituted for the friction element of the prior art, with the result that more rapid positive seating of the out-of-round rotatable surface against the improved friction element is possible.

FIG. 1 illustrates one embodiment of a friction element of this invention. The element 10 is in the shape of a segment of a cylinder, though it may have any desired shape, having a frictional contact surface 12. This surface 12 will be applied against a rotating element such as a brake drum in the braking operation of the element. The element is composed of a continuous friction base material 14, having chips 16 of a second friction material embedded in its frictional contacting surface 12. The chip material has a higher coefficient of friction and a lower resistance to wear than the base material.

In the manufacture of element 10, the chip material 16 is formed first by mixing the chip ingredients and moulding them into a solid sheet under heat and pressure. The sheet is then comminuted into the desired particle size which is about 3 to 4 mesh for optimum performance. The resulting chips are placed either at random or in a pattern against the frictional contacting surface forming wall of a conventional frictional element mould. The base friction material stock is then added on top of the chip material and moulded under heat and pressure into a raw friction element. This raw friction element can then be finished in any desirable manner, such as by machining and/or cutting to size. The above method is merely illustrative, and other methods for manufacturing the friction element will be obvious to those skilled in the art.

FIG. 2 represents another embodiment of the friction element 20 of this invention differing only from that of FIG. 1 by having the chip friction material 26 extending throughout the entire base friction material 24, as well as being embedded in frictional contacting surface 22.

FIG. 5 is a cross-sectional view of the element 20 taken along line 5—5 of FIG. 2. This element could be manufactured in a conventional manner by mixing the comminuted chip material into the stock base friction material before moulding.

FIG. 3 represents yet another friction element 30 of this invention. A base of conventional friction material 34 in the shape of a segment of a cylinder has a surface 32 upon which has been firmly adhered a thin lamina of a second friction material 36. The second friction material 36 has a higher coefficient of friction and a lower resistance to wear than the base friction material 34.

FIG. 6 shows in cross-section the friction element 30, which may be manufactured by separately moulding the base and thin lamina and subsequently joining them, by preforming one part and mould the other directly to the first, by moulding the two simultaneously in one mould, or by other methods which will be apparent to one skilled in the art.

FIGS. 7 through 9 illustrate the use of the friction elements of this invention and their improved ability, when compared to the prior art elements, to seat rapidly against an out-of-round rotating surface. FIG. 7 shows schematically a rotatable device 40, which can be, for instance, a brake drum of any size, having a friction-element-contacting-surface 42 about its periphery. A friction element 44 is shown being brought to bear against the surface 42 for the purpose of decreasing or stopping the rotation of the device 40. The problems associated with an out-of-round friction-element-contacting-surface 42 are apparent in FIG. 8, which is a partly broken away cross-sectional view taken along line 8—8 of the apparatus of FIG. 7. A protrusion 46 in the surface 42 prevents the friction element 44 from seating across its entire width against the surface 42. Frictional contact is then confined only to the area of the protrusion 46, radically decreasing the deceleration capacity of the friction element until such time as either the protrusion 46 has been abraded away, or a suitable channel has been worn into the friction element 44, or some combination of the two has taken place. The friction material of the prior art friction elements is generally of a very hard nature in order to provide for long life and good wear resistance. Thus the wearing in time of a new friction element against an out-of-round surface is unduly long.

The improvement made possible by the friction elements of this invention is illustrated in FIG. 9, in which a friction element 50 of this invention has been substituted for the prior art friction element 44 of FIG. 8. The element 50 has imbedded in its frictional contacting surface 52 chips of a second friction material 56 having a higher coefficient of friction and a lower resistance to wear than the base friction material 54. The embedding of the relatively softer friction material 56 in the frictional contacting surface 52 has the effect of presenting a relatively softer surface to the out-of-round rotating device 40, thus permitting more rapid erosion of a channel in the friction element to accommodate protrusion 46, thereby permitting more rapid seating of the friction element. Though the chip material 56 is softer than the base material 54, its higher coefficient of friction ensures that the overall coefficient of friction of the frictional contacting surface 52 will be entirely satisfactory for proper braking.

The overall life of the friction elements of this invention is not noticeably different from friction elements constructed entirely of the prior art conventional friction material. Though the embodiment of the friction element of this invention discussed in FIG. 9 is of the type shown in FIG. 1, the discussion is equally applicable to the operation and advantages of the other embodiments of this invention disclosed in FIGS. 2 and 3.

The composition of the friction material making up the chips or thin laminate previously referred to can be as follows:

COMPOSITION OF SPECIAL FRICTION MATERIAL

| Ingredient | Percent | |
|---|---|---|
| | Broad range | Preferred range |
| Asbestos fiber [1] | 50–70 | 60–65 |
| Synthetic phenolic resin | 15–25 | 18–20 |
| Friction particles [2] | 0–10 | 6–8 |
| Fine brass chips [3] | 0–15 | 4–6 |
| Coloring material [4] | 0–5 | |
| Inorganic filler | 0–10 | |

[1] Chrysolite asbestos fiber [(Mg or Fe)$_2$SiO$_4$] may be used.

[2] Cardolite friction particles, composed of synthetic carbonaceous compounds containing phenolic resin reacted to infusability are satisfactory.

[3] SAE No. 72.

[4] The color of the above friction material will be white. However, if desired, ferric oxide will impart a red color and chromic oxide a green color, while carbon will impart a black color.

The composition of the base friction material, which can be the same as conventional friction material, is, for purposes of illustration as follows:

Composition of conventional friction material

| Ingredients: | Percent |
|---|---|
| Asbestos fiber | 36 |
| Resin binder | 20 |
| Carbon black | 1 |
| Fine brass chips | 5 |
| Litharge powder (PbO) | 16 |
| Pulverized lead | 3 |
| Barytes ($BaSO_4$) | 5 |
| Sulphur | 3 |
| Graphite | 5 |
| Cardolite friction particles | 6 |
| | 100 |

Preferably, as illustrated, the base material contains fibrous asbestos, which because of its excellent heat resisting properties and its good friction characteristics, is almost universally used in brake lining base material.

The binder used in either the special friction material or the conventional base material may be either a resin or a rubber. Generally, a thermosetting synthetic resin of the phenolformaldehyde type is preferred because of the high tensile strength and hardness obtainable through its use.

The filler which adds body to the composition and, in part, controls the friction coefficient of the lining, may comprise one or more of the substances known to the art for such use, such as fine brass chips, Litharge powder, pulverized lead, Barytes, sulphur, and graphite.

When the special friction material is imbedded in the surface of a friction element of this invention, it is preferable that it should constitute from 25 to 50% of the surface. The chip size is preferably 3 to 4 mesh, but can satisfactorily be from a small fraction of an inch to a few inches in exposed length, that is, from fine powder to large chunks.

The chip and fine lamina material may be made of the same or a different color than the base material. Using different colors facilitates rapid recognition of the products of this invention by the consumer.

The friction elements of this invention are useful in practically any area which utilizes conventional friction elements. This includes both off-the-road and on-the-road uses such as in winches, drag lines, steam shovels, construction cranes, trailers, tractors, automobiles and mine equipment.

EXAMPLE I

Tests were conducted to compare the frictional characteristics of conventional friction material with those of the special friction material. A block of conventional friction material having the composition suggested above was compared to a block of material having a composition within the preferred range for the special friction material, also as specified above. The tests followed the well known General Motors Corporation Research C-1 procedure and involved measuring the coefficients of friction of the test blocks at various fixed contact pressures as the temperatures of the blocks rose due to heat of friction. Averaging the coefficients obtained at the various pressures at a particular temperature produced the "average frictional value" figures shown below. The "wear" data represents the average thickness, in inches, of test block worn away during each test. All tests were run for the same length of time.

COMPARISON OF FRICTIONAL CHARACTERISTICS

| | "Average" frictional values | |
|---|---|---|
| | Special element | Conventional material |
| Temperature of test, ° F.: | | |
| 100 | .40 | .33 |
| 300 | .42 | .33 |
| 500 | .48 | .32 |
| 600 | .43 | .31 |
| 700 | .45 | .19 |
| 750 | .43 | .10 |
| 800 | .42 | Faded |
| Wear, inches | .067 | .012 |

It can be observed from the test data set out above that the coefficients of friction of the special friction material are higher at any temperature than those of the conventional material, and that the special friction material has a lower resistance to wear than the conventional material.

The details that have been set out above are provided for the purpose of illustration, not restriction, and variations therefrom may be made within the scope of the appended claims.

Having thus described my invention, I claim:

1. A friction element comprising a base comprising a first friction material and having a frictional contacting surface, and chips comprising a second frictional material and being embedded in said surface; said chip material having a higher coefficient of friction and a lower resistance to wear than said base material; said chips comprising from 25 to 50 percent of said frictional surface and having a particle size of from 3 to 4 mesh; said chip material comprising asbestos fiber resin binder and filler; said first friction material comprising asbestos fiber, resin binder and filler; said chip material consisting essentially of from 60 to 65 percent asbestos fiber, from 18 to 20 percent resin binder, from 6 to 8 percent friction particles, and from 4 to 6 percent fine brass chips.

2. A friction element as defined in claim 1 in which said chip material further includes between 0 and 5 percent coloring material and between 0 and 10 percent inorganic filler.

References Cited

UNITED STATES PATENTS 2,136,585 11/1938 Bruce ---------------- 161—168
2,253,608 8/1941 Bruce -------------- 161—205X
2,686,140 8/1954 De Gaugue, Jr. ---- 161—162X
3,344,094 9/1967 De Gaugue -------- 260—41.5X JOHN T. GOOLKASIAN, Primary Examiner G. W. MOXON, II, Assistant Examiner U.S. Cl. X.R.

161—168, 205; 188—251